United States Patent [19]

Pochmarski et al.

[11] Patent Number: 4,941,913
[45] Date of Patent: Jul. 17, 1990

[54] PROCESS FOR HEATING STEEL MELTS AS WELL AS DEVICE FOR PERFORMING THIS PROCESS

[75] Inventors: Luzian Pochmarski, Roseggerstrasse; Otto Köller, Kerpelystrasse, both of Austria

[73] Assignee: Voest-Alpine Stahl Donawitz Gesellschaft M.B.H., Leoben-Donawitz, Austria

[21] Appl. No.: 377,095

[22] Filed: Jul. 10, 1989

[30] Foreign Application Priority Data

Jul. 22, 1988 [AT] Austria .................................. 1882/88

[51] Int. Cl.$^5$ .............................................. C21C 7/06
[52] U.S. Cl. ..................................... 75/537; 266/221
[58] Field of Search ................ 75/46, 53, 58, 57, 51.1, 75/49

[56] References Cited

U.S. PATENT DOCUMENTS

| | | | |
|---|---|---|---|
| 3,598,383 | 8/1971 | Moore | 75/51.1 |
| 3,885,957 | 5/1975 | Richter | 75/58 |
| 4,036,635 | 7/1977 | Klapdar | 75/58 |
| 4,636,249 | 1/1987 | Laycock | 75/58 |

*Primary Examiner*—Peter D. Rosenberg
*Attorney, Agent, or Firm*—Cushman, Darby & Cushman

[57] ABSTRACT

In a process for heating within a ladle (5) steel melts (10) being covered with a slag (8) rich in iron oxides, in particular for continuous steel production processes such as, for example, the KVA-process, thereby using metallothermal heat, there is (are) during filling the ladle (5), insufflated by an inert gas via nozzles (14) provided in the bottom (12) of the receiving ladle (5) for the mixture of bath and slag a metal, such as, for example, Al, Si, their mixtures or alloys, in particular FeSi, exothermically reacting with the oxygen of the bath and with the oxygen of the slag as well as, optionally, pulverulent slag formers, such as, for example, CaO, Al$_2$O$_3$, MgO and/or SiO$_2$.

12 Claims, 1 Drawing Sheet

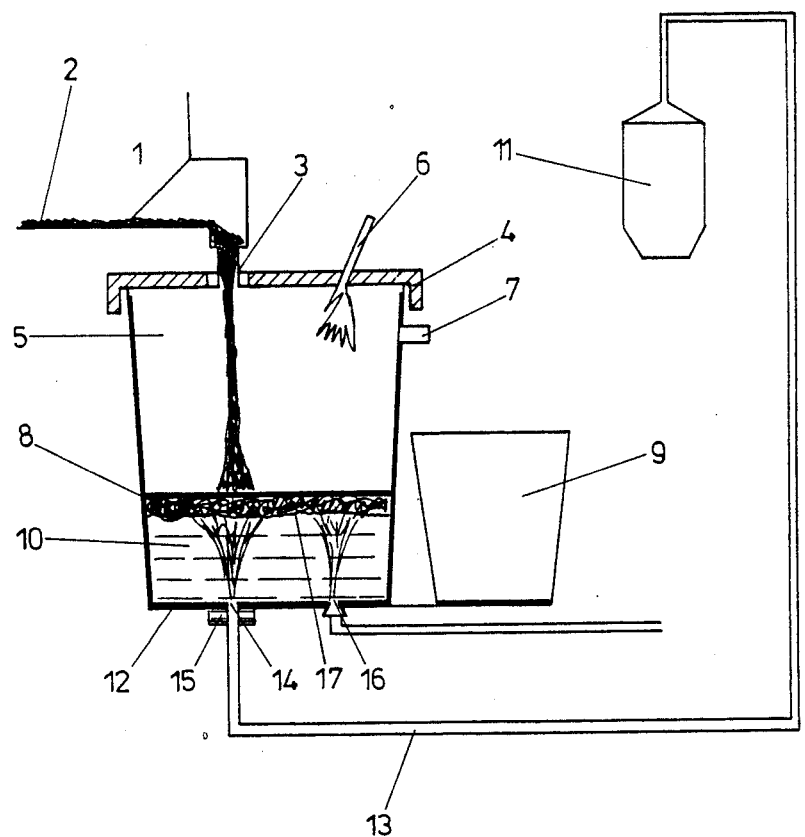

PROCESS FOR HEATING STEEL MELTS AS WELL AS DEVICE FOR PERFORMING THIS PROCESS

BACKGROUND OF THE INVENTION

1. Field of the Invention

The invention refers to a process for heating within a ladle steel melts being covered with a slag rich in iron oxides, in particular for continuous steel production processes such as, for example, the KVA-process, thereby using metallo-thermal heat, as well as to a device for performing this process.

2. Description of the Prior Art

It is known that materials capable of reacting with the oxygen contained in a metal bath can be used for deoxidizing purposes and it is further known that the bath is heated by such a deoxidation, because additional heat is generated by the oxidation of the charged material. The generated heat is not limited to the heat of reaction of the charged material reacting with oxygen dissolved within the bath but consists at least partially also of the heat of solution of the charged material within the metal bath. For deoxidation purposes there are, as a rule, used metals reacting with oxygen, such as, for example, aluminum or silicon or also earth alkaline metals. It is in particular in continuously operated steel production processes such as, for example, the KVA-process, that a melt being only slightly heated above the liquidus temperature flows together with a slag containing iron oxide into a receiving receptacle, and heating of the molten bath could be improved by utilizing, in particular, also the oxygen contained in the slag for metallothermal processes. The drawback of such a procedure is, however, superheating of the slag, and deoxidation reactions being performed by adding metallo-thermally reacting materials to the slag result in an only insufficient heating of the bath on account of side reactions taking place within the liquid slag.

SUMMARY OF THE INVENTION

The invention now aims at providing a process which allows to achieve effective heating of the molten bath with accompanying deoxidation thereof and without destroying the phase interface between bath and slag and which allows superheating of the slag, so that the separation of the slag is not disturbed. For solving this task, the process according to the invention comprises the feature of insufflating by means of an inert gas and during filling the ladle a metal, such as, for example, Al, Si, their mixtures or alloys, in particular FeSi, exothermally reacting with the oxygen of the metal bath and with the oxygen of the slag as well as, optionally, pulverulent slag formers, such as, for example, CaO, Al$_2$O$_3$, MgO and/or SiO$_2$, via nozzles provided in the bottom of the receiving ladle for the mixture of metal bath and slag. Such metals being capable of exothermically reacting with the oxygen of the metal bath and the oxygen of the slag can be introduced as a pulverulent mixture, and materials in question for such an exothermic reaction are, as a rule, aluminum and silicon as well as their mixtures or alloys. On account of such metallothermically reacting materials being insufflated by an inert gas via nozzles provided within the bottom of a receiving ladle, there is simultaneously made sure a uniform distribution of the exothermically reacting materials within the bath and the bath is homogeneously heated. The exothermal reaction caused by insufflating metallo-thermically acting materials takes place at the contact surface between bath and slag and releases heat at this location, noting that advantageously great amounts of exothermically acting solid materials are insufflated for this exothermal reaction. On account of insufflating being effected via a bottom nozzle and not via bedstones being provided with oriented passages, a greater grain size of the insufflated materials can be used for insufflating the required amount within the time interval being at disposal for filling the ladle. Essential for the purpose of obtaining the desired heating effect at the contact surface between metal bath and slag is, in this case, a slag rich in iron oxides and the use of an inert gas for insufflating the metallo-thermically reacting materials, thereby substantially avoiding reactions within the metal bath. On account of heating the bath, the melt is more pronouncedly heated over the liquidus temperature, and a stable phase interface between slag and metal bath is formed, which phase interface facilitates the separation of the slag. Such metallo-thermically reacting mixtures can be insufflated together with pulverulent slag formers such as, for example, CaO, Al$_2$O$_3$, MgO and SiO$_2$ or their mixtures, so that a good slag formation is reliably made sure, and the energy of the jet of inert gas being blown through the bottom of the receiving ladle can be adjusted such that the heat produced by the exothermic reaction is homogeneously and reliably distributed within the bath and simultaneously intermixing of metal bath and slag is adjusted to such a degree that the reaction of the silicon dissolved within the metal bath with the FeO of the slag and the exothermic heat produced thereby can be utilized for further heating the melt. A considerable part of the transferred heat is thus produced at the phase interface itself, i.e. within the intermediate layer between steel and slag, and the heat generated within this layer can to a high degree be transferred to the underlying metal bath. In addition to the metallo-thermic reactions, there is utilized the heat of solution, and a deoxidation effect can be obtained by the reaction with the oxygen being dissolved within the steel bath.

For the purpose of making optimum use of the thermal energy of the reactions taking place within the bath and within the interface between bath and slag, the procedure is advantageously such that 0.1 to 2 percent by weight, in particular 0.5 to 2 percent by weight, of metallo-thermically acting materials are insufflated via the ladle bottom within 20 to 100 percent of the time interval required for filling the ladle. Insufflating of inert gas together with the metallo-thermically reacting materials can, in case of pneumatic conveying, simply be stopped by closing the blowing nozzles, noting that a homogeneous distribution and a homogeneous heating may be maintained by additionally insufflating inert gas without the addition of metallo-thermically acting materials. When insufflating the metallo-thermically acting materials within 20 to 100 percent of the time interval required for filling the ladle, the procedure is such that, in dependence on the intended temperature increase, greater or smaller insufflating ratings are used within this time interval. Thus, considering the amount of the metal/slag-mixture flowing from above into the receiving ladle, the insufflating rating is, for the purpose of obtaining a continuous but not violent reaction, adjusted to the amount in flowing per unit of time and thus to the amount of FeO present within the slag. In this case, the procedure is advantageously such that the amount of inert gas is, during insufflating the metallo-thermically acting materials, adjusted to a value between 5 and 30 liters inert gas per kilogram of solid material to be insufflated. The variation of the amount of inert gas per kilogram solid material to be insufflated primarily serves the purpose to adjust different scavenging energies in the course of filling the ladle and considering the rising bath level. Adjusting of the amount of the metallo-thermically acting materials within the preferred range of 0.1 to 2 percent by weight, in particular 0.5 to 2 percent by weight, makes sure that an excessively high content of silicon or aluminum within the steel is avoided, noting that the use of silicon has, beside a deoxidation of the bath, the effect of avoiding undesired boiling reactions on the phase boundary between bath and slag on account of the formation of CO. The slag layer remaining above the molten bath and above the phase interface between bath and melt is thus kept calm and acts as a thermal insulation against radiation losses of the exothermal reactions taking place within the bath and at the phase interface.

The inventive device for performing this process and having a ladle comprising at least one bottom nozzle is characterized by comprising the feature that at least one bottom nozzle is connected with a pneumatic conveying means for metallo-thermically acting materials. For the purpose of obtaining a good scavenging effect on account of a closed circulating flow of the bath, it has proved as particularly advantageous to arrange the scavenging elements along a circle, noting that the arrangement is preferably selected such that a plurality of bottom nozzles is provided at a distance from the ladle wall, said bottom nozzles being concentrically arranged relative to the ladle wall along a diameter having an extent between 50 and 75 percent of the diameter of the ladle. An optimum mixing effect and thus homogeneous heating of the bath can be obtained if the bottom nozzles are arranged at equal distances along the circumference of the enveloping curve and if there are provided for each bottom nozzle being connected to the pneumatic conveying means one to three bottom nozzles being supplied with inert gas, noting that, when using 1 to 3 scavenging elements on the same radius as the insufflating element, a further circulating flow, and thus distribution of the generated heat of reaction, is reliably maintained during that process stage during which the insufflating procedure is stopped or interrupted. Advantageously, the scavenging elements or, respectively, scavenging nozzles are located within two thirds of the radius of the ladle bottom, as calculated from the center of the ladle bottom. Adjustment of the desired amount of inert gas and, respectively, interruption of the insufflating procedure can be effected by means of corresponding throttling members, respectively, closing members in the respective blast conduits.

On account of the reaction taking place at the phase boundary with the FeO-content of the slag there is obtained, beside an improvement of the effective heating, also a higher yield in iron by reducing to iron part of the iron oxide of the slag and a reduced attack of the refractory material of the ladle by the iron oxide. When using silicon, said reduction of iron oxides is accompanied by simultaneously reducing the amount of silicon dissolved in the steel bath, so that the requested maximum content of the bath in silicon can be adjusted by correspondingly adjusting the energy of the gas jet and thus the thickness of the phase interface between bath and slag participating in the reaction. It is however simultaneously possible to maintain during the reactions a high silicon content in the steel bath in a reliable manner, said silicon content contributing to avoiding undesired boiling reactions at the phase boundary beside a deoxidation effect.

On account of insufflating such metallo-thermically reacting material from below, the above mentioned parameters can be adjusted in a simple manner and be adapted to the existing filling level of the ladle.

BRIEF DESCRIPTION OF THE DRAWING

In the following, the invention is further explained with reference to the drawing schematically showing an example of embodiment of a device for performing the process.

DETAILED DESCRIPTION OF THE PREFERRED EMBODIMENT

In the drawing, there is schematically indicated by the reference numeral 1 a melting receptacle from which a mixture 2 of metal and slag flows continuously via a tapping unit 3 into a receiving ladle 5 being heated to a high temperature and being provided with a cover 4. The cover 4 is provided with a cover burner 6, so that it becomes possible to heat the ladle to sufficiently high temperatures also during tapping. The receiving ladle 5 has further a slag drain opening 7 via which the floating slag 8 flows, when having reached the drain opening 7 on account of having been dislocated, into a slag bucket 9. As soon as the steel level 10 has reached the drain opening 7, the receiving ladle 5 must be replaced by a new one, noting that simultaneously also the slag bucket 9 is replaced by a new one.

For the purpose of sufficiently heating the steel, there is insufflated into the steel bath 10 via the bottom 12 of the receiving ladle by means of a pneumatic conveyor plant 11 a pulverulent mixture of metal exothermically reacting with the oxygen of the bath and with the oxygen of the slag, optionally in common with the pulverulent slag formers. The pulverulent mixtures of metal, such as, for example, aluminum or silicon, reacting with the oxygen of the bath and, respectively, the oxygen of the slag are insufflated from the pneumatic conveyor plant 11 via a supply conduit 13 and via an insufflating opening 14 through the ladle bottom. In an advantageous manner, the insufflating opening 14 is provided with a slide valve being schematically indicated by 15 and providing the possibility to interrupt at any moment insufflating of the metallo-thermically reacting metal. For the purpose of better intermixing the steel bath and thus for providing for an optimum performance of the metallo-thermical reactions, there are provided in the ladle bottom 12 scavenging elements, being schematically indicated by 16, for inert gas. In this case, the scavenging elements 16 are preferably arranged on the same radius as is arranged the insufflating opening 14, so that the agitating intensity of the bath-slag-reaction is further improved.

It is likewise possible to provide, beside the insufflating element 14 for the metals exothermically reacting with the oxygen of the bath and of the slag, several scavenging elements 16 on the bottom 12 of the receiving ladle 5, so that a better distribution of the exothermically reacting materials in the bath is warranted and a more homogeneous heating of the bath can reliably be obtained. By adjusting the amount of inert gas supplied via the blowing opening 16, intermixing of bath and slag can be adjusted to such an extent that the reaction of the silicon dissolved in the bath with the iron oxide of the slag is spatially limited to take place at the phase interface 17 between slag 8 and steel melt 10, so that the thus generated heat is for the major part transferred to the underlying steel melt 10. In this case, the slag layer 8 acts as an insulating layer against radiation losses in upward direction.

What is claimed is:

1. Process for heating steel melts comprising:
   heating within a ladle steel melts covered with a slag rich in iron oxides; and
   exothermically reacting a metal with the oxygen of said melt and the oxygen of said slag by injecting into the mixture of steel melt and slag, via nozzles in the bottom of said ladle, said exothermically-reacting metal with an inert gas during filling of said ladle.

2. Process as claimed in claim 1, charaterized in that from 0.1 to 2 percent by weight of metallo-thermically reacting material is insufflated via the ladle bottom within 20 to 100 percent of the time interval required for filling the ladle.

3. Process as claimed in claim 1 or 2, characterized in that the amount of inert gas is adjusted to be between 5 and 30 liters of inert gas per kilogram of solid material to be insufflated.

4. Device for performing the process according to claim 1 or 2, comprising a ladle having at least one bottom nozzle, characterized in that at least one bottom nozzle is connected with a pneumatic conveying means for metallo-thermically reacting materials.

5. Device as claimed in claim 4, characterized in that a plurality of bottom nozzles is provided at a distance from the ladle wall, said bottom nozzles being concentrically arranged relative to the ladle wall along a diameter equal to between 50 and 75 percent of the diameter of the ladle.

6. Device as claimed in claim 5, characterized in that the bottom nozzles are arranged at equal distances along the circumference of the enveloping curve and in that there are provided for each bottom nozzle connected to the pneumatic conveying means on to three bottom nozzles which are supplied with inert gas.

7. A process for heating steel melts according to claim 1, wherein said metal is selected from the group which consists of Al, Si, and their mixtures or alloys, including FeSi.

8. A process for heating steel melts according to claim 7, wherein in addition to said exothermically-reacting metal, pulverulent slag formers are added to said mixture of steel melt and slag.

9. A process for heating steel melts according to claim 8, wherein said pulverulent slag formers are selected from the group which consists of $CaO$, $Al_2O_3$, $MgO$, and $SiO_2$.

10. A process for heating steel melts according to claim 2, wherein said metallo-thermically reacting material constitutes 0.5 to 2.0 percent by weight.

11. A process for heating steel melts according to claim 1, wherein said process is employed in a continuous steel production process.

12. A process for heating steel melts according to claim 11, wherein said continuous steel production process is the KVA process.

* * * * *